United States Patent [19]

Amano et al.

[11] Patent Number: 4,838,897
[45] Date of Patent: Jun. 13, 1989

[54] REFORMER

[75] Inventors: Yoshiaki Amano, Ibaraki; Eiji Yokoyama, Kashiwa; Hideo Ohyauchi, Ibaraki, all of Japan

[73] Assignee: Hitachi, Ltd., Tokyo, Japan

[21] Appl. No.: 120,688

[22] Filed: Nov. 9, 1987

Related U.S. Application Data

[63] Continuation of Ser. No. 849,890, Apr. 9, 1986, abandoned.

[30] Foreign Application Priority Data

Apr. 10, 1985 [JP] Japan .................. 60-74251

[51] Int. Cl.[4] .................. B01J 7/00
[52] U.S. Cl. .................. 48/196 A; 48/94; 422/197; 422/204
[58] Field of Search .................. 48/196 A, 196 R, 107, 48/94, 95, 102 R, 89, 105, 84; 422/197, 198, 202, 204

[56] References Cited

U.S. PATENT DOCUMENTS

| | | | |
|---|---|---|---|
| 1,959,151 | 5/1934 | Berkley | 432/602 |
| 3,215,502 | 11/1965 | Korwin | 422/197 |
| 3,635,682 | 1/1972 | Vine et al. | 48/94 |
| 3,698,957 | 10/1972 | Sanderson | 136/86 C |
| 3,871,838 | 3/1975 | Henkel et al. | 48/107 |
| 3,909,299 | 9/1975 | Corrigen | 48/94 |
| 3,996,025 | 12/1976 | Gulden | 48/107 |
| 4,071,330 | 1/1978 | Sederquist | 48/94 |
| 4,412,975 | 11/1983 | Parizot et al. | 422/198 |

Primary Examiner—Peter Kratz
Attorney, Agent, or Firm—Antonelli, Terry & Wands

[57] ABSTRACT

The present invention relates to a reformer for producing a hydrogen rich gas by reaction of natural gas with steam by a catalytic action with heating, and particularly to the heater in the reformer, where the heating section of the heater is composed of a heating section by burner combustion and a heating section by catalytic combustion, and a stable combustion less susceptible to fluctuations in the feed rate or pressure of fuel or air can be obtained by the catalytic combustion.

7 Claims, 4 Drawing Sheets

REFORMER

This application is a continuation of application Ser. No. 849,890, filed Apr. 9, 1986, now abandoned.

FIELD OF THE INVENTION

This invention relates to a reformer for producing a hydrogen-rich gas by reforming natural gas with steam through a catalytic action with heating, and particularly to an improvement of the reformer.

DESCRIPTION OF THE PRIOR ART

A conventional reformer, as disclosed for example in U.S. Pat. No. 3,698,957, will be described below, referring to FIGS. 4 to 6. In FIG. 4, numeral 1 is a reformer shell, 2 a plurality of reformer tubes, provided in the reformer shell 1, 3 a catalyst supported in the reactor tubes 2, 4 a raw material fuel inlet for introducing a mixture of natural gas and steam into the shell 1, 5 a reformed gas outlet for discharging a reformed gas, 6 a heater for heating the reformer tubes 2 provided at the bottom of the shell 1, 7 is a fuel feed inlet for feeding a heating fuel to the heater 6, 8 an air feed inlet for feeding combustion air to the heater 6, and 9 is a combustion flue gas outlet for discharging a combustion flue gas after heating the reformer tubes 2.

FIGS. 5 and 6 show details of the heater 6, where 6A is a heater body, 10 is a plurality of heating fuel nozzles provided at the periphery in the body 6A, and 11 is air nozzles provided at the individual heating fuel nozzles 10, where a pair of the air nozzle 11 and the heating fuel nozzle 10 forms a burner. Numeral 12 is a heating fuel header for distributing the heating fuel fed from the heating fuel feed inlet 7 to the individual heating fuel nozzles 10, 14 is a heating fuel flow rate control valve for controlling the heating fuel flow rate to the heating fuel feed inlet 7, 15 is an air flow rate control valve for adjusting the air flow rate to the air feed inlet 8, 16 is a pilot burner for igniting the burners to maintain the combustion, 17 is an ignition rod for igniting the pilot burner 16, 18 is an ignition device for generating a spark at the ignition rod 17 and 19 is a pilot gas electromagnetic valve for shutting off the heating fuel to the pilot burner 16.

In the foregoing conventional reformer, a raw material fuel is introduced into the reformer shell 1 from the raw material fuel inlet 4 while heating the reformer tubes 2 by the burners in the heater 6. The natural gas and steam in the raw material fuel undergo reaction by the action of catalyst 3 in the reformer tubes 2 to produce a reformed gas. The reformed gas is discharged from the reformed gas outlet 5 through inner tubes 20 in the reformer tubes 2. In FIG. 4, numeral 21 is a heat-insulating material provided on the reformer shell 1.

Since the heating section of the heater 6 is composed only of burners in the foregoing conventional reformer, the reformer has the following problems when it is applied to a system of vigorous load fluctuation such as a fuel cell system:

(1) Feed pressure of heating fuel or air is fluctuated due to a sudden change of load, and an unstable combustion and a misfiring phenomenon are liable to take place. Particularly in a partial load operation, the heating fuel feed rate to the heating fuel nozzles 10 and the air feed rate to the air nozzles 11 are reduced, and thus the flow velocities of the heating fuel and the air are lowered and deviated from the design points, readily causing an unstable combustion or a misfiring phenomenon.

(2) It is necessary to provide additional members for ignition and pilot burning, and thus their reliability must be made higher for the safety purpose.

SUMMARY OF THE INVENTION

An object of the present invention is to solve the problems of the prior art and to provide a reformer capable of maintaining a stable combustion against a partial load operation.

The present invention provides a reformer for producing a hydrogen-rich gas by reaction of natural gas with steam through a catalytic action, which comprises a reformer shell, a plurality of reformer tubes provided in the reformer shell, a catalyst supported in the reformer tubes, and a heater for heating the reformer tubes, provided at the bottom of the reformer shell, wherein the heating section of the heater comprises a heating section by burner combustion and a heating section by catalytic combustion, and the duty of the burner combustion is shared with the catalytic combustion less susceptible to fluctuations in the feed rate and pressure of heating fuel or air, thereby maintaining a stable combustion against a load fluctuation or a partial load operation.

DETAILED DESCRIPTION OF THE PREFERRED EMBODIMENTS

Figure 1:
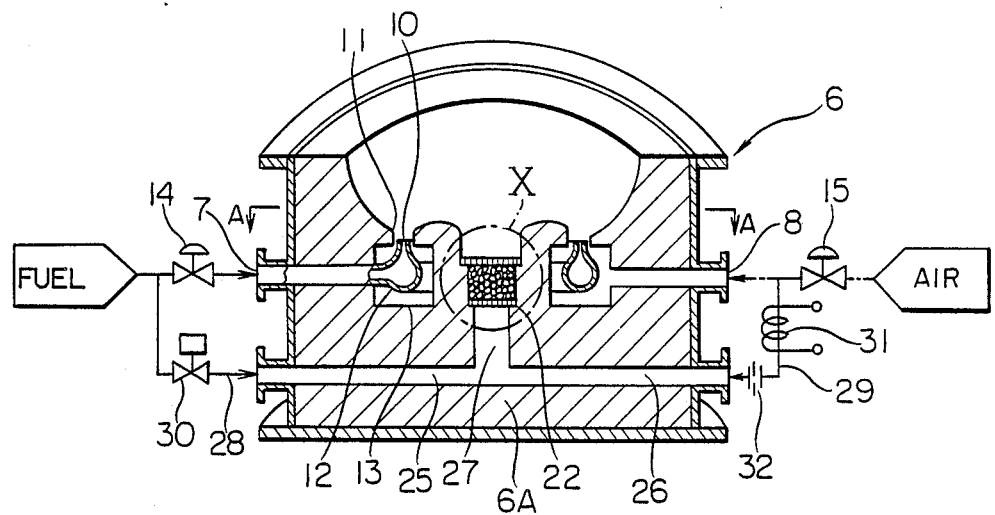
FIG. 1 is a vertical cross-sectional view of a heater in the present reformer.
Figure 2:
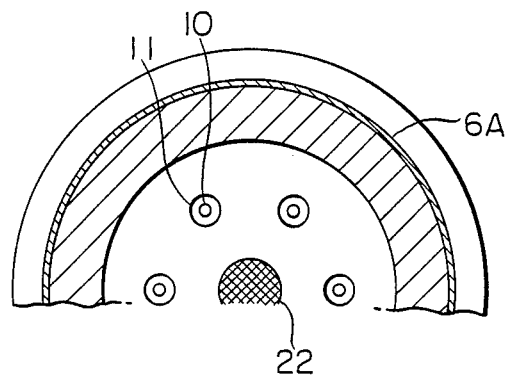
FIG. 2 is a cross-sectional view along the line A—A in FIG. 1.
Figure 3:
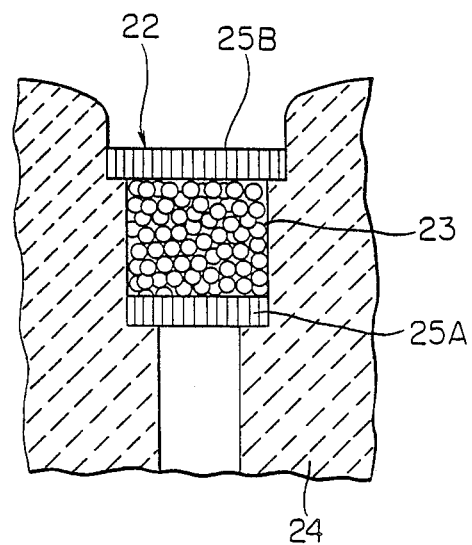
FIG. 3 is a detailed cross-sectional view of part X in FIG. 1.
Figure 4:
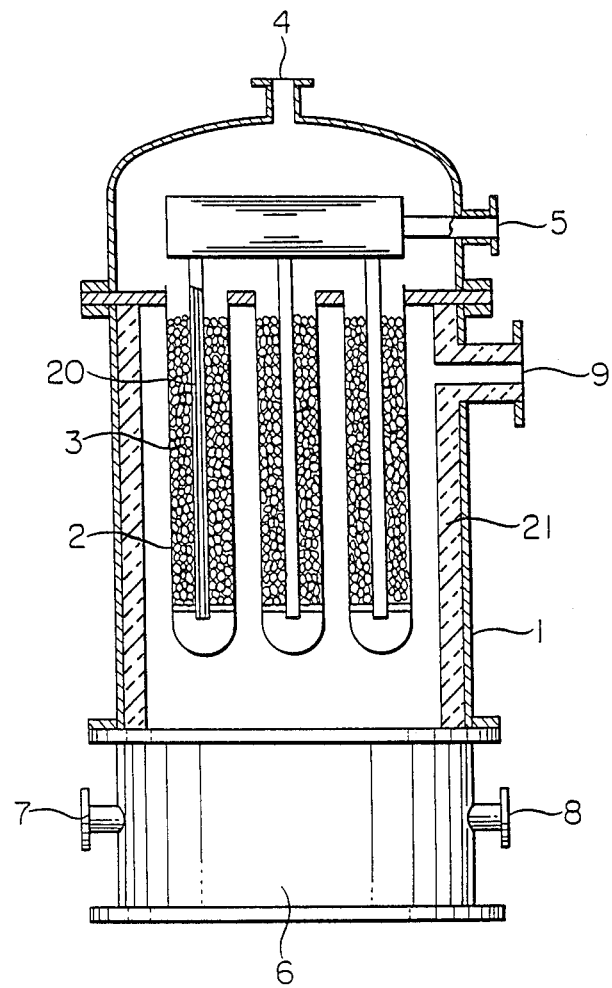
FIG. 4 is a vertical cross-sectional view of a conventional reformer.
Figure 5:
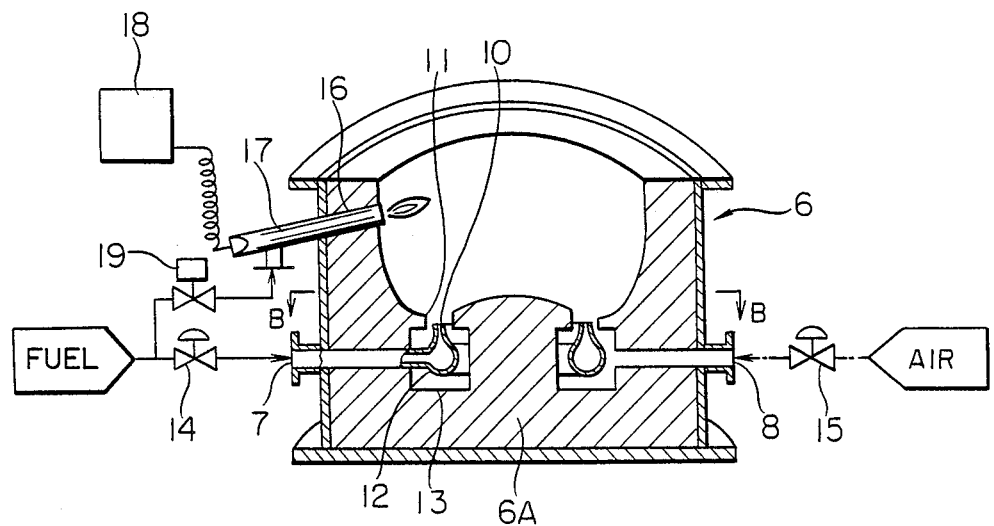
FIG. 5 is a cross-sectional view of the heater in FIG. 4.
Figure 6:
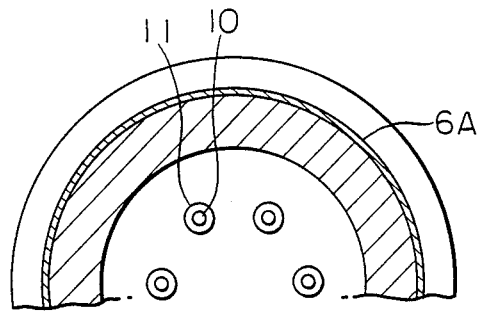
FIG. 6 is a cross-sectional view along the line B—B in FIG. 5.

Embodiments of the present invention will be described in detail below, referring to FIGS. 1 to 3, where the same symbols as in FIGS. 5 and 6 designate the same or similar members. In the heater, a catalytic combustion section 22 is provided at the center within the burners each composed of a heating fuel nozzle 10 and an air nozzle 11, and carries out combustion by action of a combustion catalyst 23 by passing a gas mixture of raw material fuel and air (or oxygen) over the combustion catalyst 23. The combustion catalyst 23 is supported on a honeycomb 25A in a refractory cylinder 24. Furthermore, another honeycomb 25B is provided on the upper bed surface of combustion catalyst 23 to suppress upward movement of the catalyst and make the combustion gas uniform. The cylinder 24 is inserted in the heater body 6A in which a heating fuel feed passage 25, an air feed passage 26, and a gas mixture feed passage 27 for mixing the heating fuel and the air fed through said two passages and feeding the resulting gas mixture to the combustion catalyst 23 are provided. The heating fuel feed passage 25 is connected to a branch pipe 28 branched from the pipe to the raw material fuel inlet 7, whereas the air feed passage 26 is connected to a branch pipe 29 branched from the pipe to the air inlet 8. The branch pipe 28 is provided with a block valve 30 for shutting off the heating fuel, and the branch pipe 29 is provided with a heater 31 for preheating the air at start-up, and an orifice 32 for controlling the air flow rate.

In the present reformer, the heating section of the heater is composed of a heating section by burner combustion and a heating section by catalytic combustion having a high combustible limit, i.e. a broad combustible range in a mixing ratio of fuel to air, and a high blow-out limit, i.e. a high gas flow velocity causing a blow-out of flame, and thus a stable combustion can be obtained in the catalyst combustion section 22 at the center against a fluctuation in the flow rate and pressure of heating fuel or air due to a load fluctuation or even against a partial load operation, whereby the burner combustion section susceptible to an unstable combustion around the catalytic combustion section can be stabilized. That is, an unstable combustion and occurrence of a misfiring phenomenon due to a load fluctuation or a partial load operation can be prevented. Furthermore, ignition of the burner combustion section can be carried out by the catalytic combustion section 22, and thus an ignition device by spark discharge can be unnecessitated, eliminating a risk of explosion, etc. due to an ignition failure.

As described above, a stable combustion can be obtained against a load fluctuation and a partial load operation according to the present invention.

What is claimed is:

1. A reformer for producing a hydrogen rich gas by reaction of natural gas with steam through a catalytic action by passing the natural gas and the steam through heated reformer tubes filled with a catalyst, the reformer comprising: a reformer shell; a plurality of reformer tubes provided in the reformer shell; a catalyst supported in the reformer tubes; and a heater for heating the reformer tubes, the heater being arranged at the bottom of the reformer shell and comprising a first heating section comprising means for providing burner combustion of fuel and air, the means for providing burner combustion including a plurality of burner combustors, each burner combustor comprising a pair of a heating fuel nozzle and an air nozzle, and a second heating section comprising means for providing catalytic combustion of fuel and air, said means for providing catalytic combustion comprising a bed filled with a combustion catalyst for effecting combustion through the action of said combustion catalyst by passing a gas mixture of fuel and air through said combustion catalyst, wherein said second heating section is provided at a center of the bottom of the reformer shell and said plurality of burner combustors are provided around said first heating section at a periphery of the bottom of said reformer shell.

2. A reformer according to claim 1, wherein said combustion catalyst in the second heating section is supported in a refractory cylinder having honeycomb perforated top and bottom surfaces, thereby making combustion gas flow uniformly.

3. A reformer according to claim 1, further comprising a heating fuel feed pipe and an air feed pipe connected to the first heating section, and a heating fuel feed passage means and an air feed passage means provided in the heater, each of the heating fuel feed passage means and the air feed passage means having an inlet and an outlet; wherein the inlet of the heating fuel feed passage means is connected via a branch pipe to the heating fuel feed pipe and the inlet of the air feed passage means is connected via a branch pipe to the air feed pipe and the outlets of each of said heating fuel feed passage means and air feed passage means are operably connected to said second heating section.

4. A reformer according to claim 3, further comprising a gas mixture feed passage means connected to the outlet of the air feed passage and the outlet of the heating fuel feed passage for mixing air and heating fuel and feeding the resulting mixture to the combustion catalyst of said second heating section.

5. A reformer according to claim 1, wherein the each of the first and second sections of the heater are arranged for discharging products of combustion into a common combustion zone located at the bottom of the reformer shell.

6. A reformer according to claim 1, further comprising means for delivering fuel and air to said first heating section and to said second heating section, wherein each of said fuel and said air are delivered from a common source.

7. In a reformer having a reformer shell, a plurality of reformer tubes in said reformer shell, a catalyst supported in said reformer tubes and a heater for heating said reformer tubes, the improvement comprising: said heating including means for heating by burner combustion and means for heating by catalytic combustion, the means for heating by catalytic combustion including a bed filled with a combustion catalyst and being provided at a central portion of the bottom of the reformer shell and said means for burner combustion being provided around said means for catalytic combustion at a periphery of said bottom of said reformer shell and including a plurality of burner combustors, each burner combustor comprising a pair of a heating fuel nozzle and an air fuel nozzle, whereby stable combustion can be carried out in said heater.

* * * * *